April 26, 1966 J. MARLEY 3,248,676
HIGH SPEED MAGNETIC CORES
Filed April 12, 1962

INVENTOR.
JOHN MARLEY
BY [signature]
ATTORNEY

United States Patent Office 3,248,676

Patented Apr. 26, 1966

3,248,676

HIGH SPEED MAGNETIC CORES

John Marley, Wayne, N.J., assignor to International Telephone and Telegraph Corporation, Nutley, N.J., a corporation of Maryland Filed Apr. 12, 1962, Ser. No. 187,031
15 Claims. (Cl. 336—233)

This invention relates to storage devices which are used in information storage systems and more particularly, to magnetic cores having rectangular hysteresis loops.

In an article entitled, "Studies in Partial Switching of Ferrite Cores," by Roger H. Tancrell and Robert E. McMahon, in the "Journal of Applied Physics," volume 31, No. 5, May 1960, it is clearly shown that partial switching from a reference saturated state of magnetism will reverse the polarity of a ferrite core by concentric shells or "domain walls" starting at the inside of the core as these shells have the shortest magnetic paths. The results of the experiments made by the authors of this article have shown that most of the variation of the switching of a core depends upon the geometry of the core.

Partial switching is the complete reversal of magnetic polarity of part of the core but not the entire core. This is shown to be accomplished by the use of coincident pulses. One pulse of a high amplitude and a narrow width and another pulse of a low amplitude and a large width are applied to the core to be switched. This can be done by applying a high-amplitude, short duration, pulse to the row wire of a selected core and a low amplitude pulse to the column wire of the selected core. The high amplitude pulse, because of its short duration, will switch very little of the cores in the column to which it is applied. The low amplitude pulse applied to the row wire will switch none of the cores to which it is applied as the amplitude of this pulse is below the coercive force of the cores.

This study has shown that the combination of the two pulses can be made to produce partial switching of 3 to 4 times more of the selected core volume than of the other cores in the column. Therefore, in this system a "1" is the larger pulse received from the selected core which has been partially switched to a width which is 3 or more times that of the cores which have not been pulsed by coincident pulses. A "0" is either the smaller pulse received from the cores in the row which have been partially switched by the high amplitude pulse alone or no pulse at all, which will result from sampling the completely unswitched column cores.

The fact that switching of a magnetic core takes place by concentric shells or domain walls and the innermost shell switches before the next consecutive shell will switch, is shown in an article by Lt. Philip I. Hershberg entitled, "Ferromagnetic Domains" in "Electro-Technology-Science and Engineering Series," number 69, January 1962. He notes how the switching moves through the core from the inside diameter to the outside diameter by concentric shells due to domain growth and that thinner magnetic cores will switch faster because domain growth is directly proportional to the core's thickness. However, the use of very thin cores is limited by the need for a structurally sound core which will permit easy wiring. Further the more surface area the core has relative to the volume, the faster it will cool.

The speed with which a shell will switch also depends on the force of the magnetic field as well as the volume of the material to be switched. The force of the magnetic field depends to a great extent on the length of the magnetic path. I have developed a core which will take advantage of the shortness of the magnetic path and also will provide a smaller volume, i.e., thickness of the domain wall to be switched while at the same time providing a core which is structurally strong, easy to wire, and provides a large cooling surface.

The prior art shows generally annular shaped cores. In order to provide a smaller volume to be switched, these cores have been made smaller, for instance, a 50–30 core or 50 mils outside diameter and 30 mils inside diameter core has in many instances been replaced by a 30–18 core or a core with 30 mils outside diameter and 18 mils inside diameter. The depth of both of these is generally approximately 15 mils. These cores present domain walls of approximately uniform thickness to the magnetic field, and each must be switched before the next one can be switched.

One of the objects of my invention is to provide a core which will have a small volume in its interior for use in partial switching systems.

Another object of my invention is a high speed magnetic core for use in systems employing partial switching.

A further object of my invention is to provide cores for partial switching which can be adapted for use in present information storage systems.

A still further object of my invention is the provision of a core which is structurally strong, has a large cooling surface compared to the used volume, and is easy to thread wires through.

A novel feature of my invention is the provision of a magnetic core which displays a radial cross sectional area wherein the thickness of the core at its smaller radii is less than the thickness of the core at its larger radii.

Another novel feature of my core is that it can be used in present information storage systems.

The above mentioned and other features and objects of this invention will become more apparent by reference to the following descriptions taken in conjunction with the accompanying drawings in which.

Figure 1:
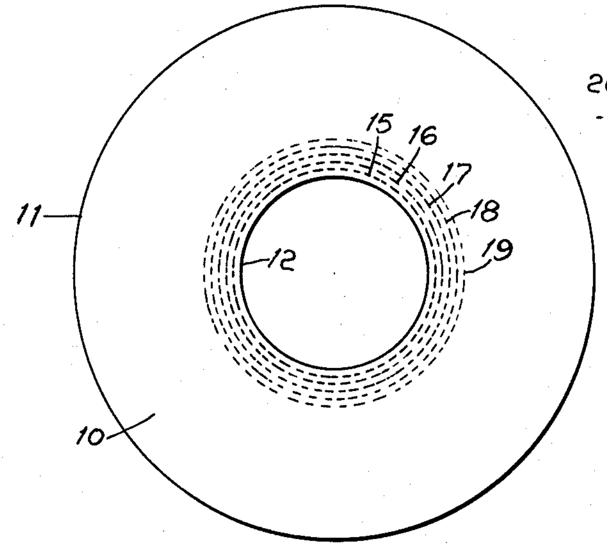
FIGURE 1 is an enlarged plan view of a core in accordance with my invention.
Figure 2:
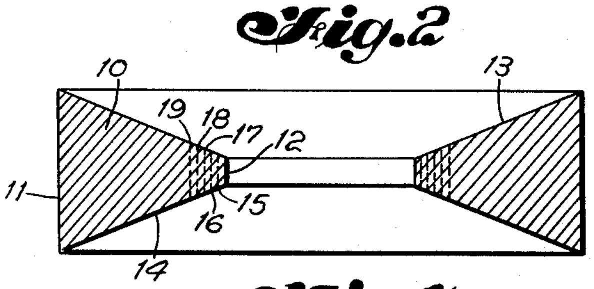
FIGURE 2 is a radial cross-sectional view of the core of FIGURE 1.

Referring now to FIGURES 1 and 2, these figures illustrate an embodiment of my invention on which are drawn theoretical domain walls to aid in the explanation and understanding of the domain wall theory. The core 10 in FIGURE 1 has an outer periphery 11, an inner periphery 12, and top and bottom surfaces 13 and 14. It is to be noted that the outer periphery is thicker than the inner periphery. Theoretical domain walls are shown as dotted lines 15, 16, 17, 18 and 19. It can be seen that the radial distance from the center of the core to 15 would be shorter than the radial distance from the center of the core to 16; and the radial distance to 16 would be shorter than one to 17, etc. Therefore, the strength of the magnetic field at 15 will be stronger than at 16 and stronger at 16 than at 17, etc. The domain wall at 15 will switch faster than the domain wall at 16 because of two reasons. First there is less volume to switch, and second the strength of the magnetic field at 15 is greater than at 16.

If, as in standard cores, 15 and 16 had been the same comparative depth and did not present less volume to the field, 15 would take longer to switch before allowing 16 to switch and so on. Therefore it can be seen that my core will switch much faster than present cores, when used in a system utilizing partial switching. The part to be switched, the interior, presents much less volume while at the same time bringing much more material in close where the shorter magnetic paths are. This is possible as the sloped design permits easy wiring allowing the interior periphery to be small. Also the inner portions of the core need not be thick because the outer portions are thick and structurally strong. Finally the surfaces 3 and 4 present larger cooling surfaces than annular shaped cores with comparable volumes.

Figure 3:
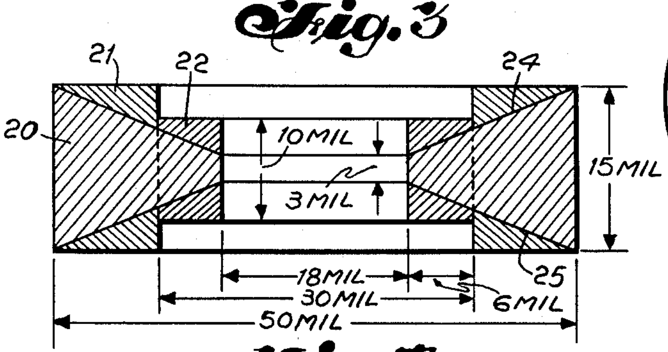
FIGURE 3 is a diagrammatic representation illustrating the comparison of my core with standard cores.

In FIGURE 3 a specific embodiment 20 of my invention is super-imposed on a 50–30 standard core 21 and a standard 30–18 core 22 which is shown inside the 50–30 core. The thickness of the 50–30 core is 15 mils and the thickness of the 30–18 core is 10 mils. My core has a thickness of 15 mils at its outer periphery and a thickness of 3 mils at its inner periphery.

Here it can be clearly seen that whereas my core is composed of approximately the same amount of material as a 50–30 core, it provides much more material than a 50–30 core within the shorter magnetic paths, allowing more magnetic force to be applied to this part of the core yet still maintaining structural stability. As compared to the 30–18 core the volume of material between the diameters of my core at 30 and 18 mils respectively is approximately one-half the volume of material of a standard 30–18 core thereby exposing less volume to the shorter magnetic paths and allowing for much faster switching in this region. Partial switching would affect essentially only this region and therefore my core would allow for much faster switching than would a standard 30–18 core used for partial switching.

Further, since my core has a standard 50 mil outside diameter, it could be easily adapted for use in standard information storage systems where the effect of switching would be slightly faster than a 50–30 but not faster than a 30–18. My core also presents larger cooling surfaces designated as 24 and 25 for approximately the same volume of material. Further, the slope of my core allows for much easier wiring. It has been found in a 30–18 core that it is difficult in many instances to thread 3 or 4 wires of suitable diameter within the interior of the core, whereas in my core, they would essentially slide down the enlarged sloped surface and pass through the inside of the core. I can get a larger number of wires within my core than can be threaded through the 30–18 core.

Figure 4:
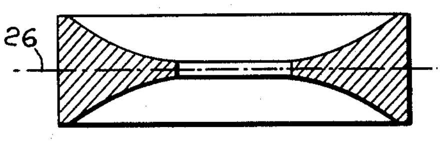
FIGURES 4, 5, 6 and 7 are enlarged views of specific embodiments of my invention.
Figure 5:
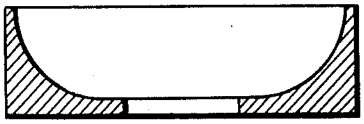

The slope of the core in this particular figure is a constant. However, as can be shown in FIGURE 4, it need not be a constant but might be parabolic or follow any other suitable curve. In FIGURE 4 the radial cross-sectional area displays a symmetrical cross section about a central axis 26. In FIGURE 5 is shown a core wherein the bottom surface of the core is flat thereby allowing the use of the bottoms of standard molds in present use and it is also easier to produce a mold for the production of this core. The upper surface may then have any desired slope so as to cause the interior of the core to be thinner and expose less volume than the exterior of the core.

Figure 6:
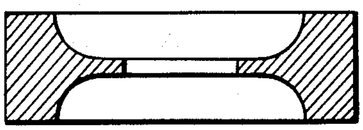

FIGURE 6 shows that by beveling the inner walls of the larger core shape and tapering them in toward the inside diameter of the core, an added advantage accrues which is the desirable property of shielding from the earth's field or other extraneous fields of magnetic force, including electromagnetic pulses from nearby cores in the memory array. These problems are serious in thin film memories, but here the heavy ring of material provides a shielding effect if the cores are not saturated in the outer layers or domains as would be the case in partial switching.

Figure 7:
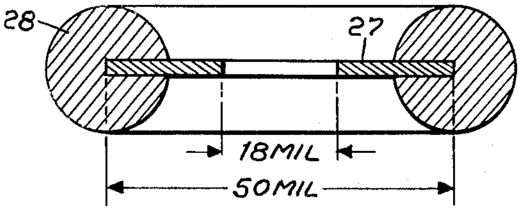

FIGURE 7 shows another ferromagnetic core according to the principles of my invention which would be easy to manufacture by pressing. It comprises a thin, flat, washer-shaped wafer 27 which would be quite fragile alone, and a bead 28, which is rolled or molded around the wafer edge to improve its strength and heat dissipating surface areas. Here again we have the effect of shielding from outside fields. I have found that a minimum thickness for the wafer is approximately 3 mils. In the embodiment shown, the outside diameter of the wafer is 50 mils, the inside diameter is 18 mils, and the thickness is 3 mils. The bead 28 need not encircle the entire wafer.

Figure 8:
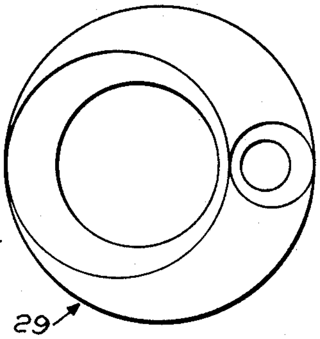
FIGURES 8 and 9 are enlarged views of a transfluxor which could be made in accordance with my invention.
Figure 9:
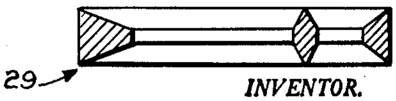

FIGURE 8 illustrates a plan view of a transfluxor 29 employing my invention. FIGURE 9 shows the radial cross sectional view of the transfluxor 29. It can be seen that my invention could be used on ferrite plates wherein holes with beveled sides are formed to be used as cores in the same manner as it can be adapted to a transfluxor shaped device.

While I have described the principles of my invention in connection with specific embodiments it is to be clearly understood that this description is made only by way of example and not as a limitation to the scope of my invention as set forth in the objects thereof and in the accompanying claims.

What is claimed is:

1. A high speed magnetic core composed of a generally toroidal shaped ferro-magnetic material which has a rectangular hysteresis loop, said core having a cross sectional area defined by an outer and at least one inner periphery, said outer and inner peripheries each having a uniform width, and a diametrical cross section wherein the outer periphery at its widest dimension is thicker than the inner periphery.

2. A high speed magnetic core according to claim 1, wherein said inner and outer peripheries are concentric.

3. A high speed magnetic core according to claim 1 wherein the diametrical cross sectional thickness decreases uniformly from the outer periphery to the inner periphery.

4. A high speed magnetic core according to claim 3 wherein the inner and outer peripheries are concentric.

5. A high speed magnetic core according to claim 4 wherein said core has top and bottom surfaces and the slopes of said top and bottom surfaces are equal at equal distances from the center of the core thus creating a symmetrical cross section about the radial axis of the core.

6. A high speed magnetic core according to claim 5 wherein the slope of the surfaces is a constant.

7. A high speed magnetic core according to claim 6 wherein the diameter of the outer periphery is 50 mils and the diameter of the inner periphery is 18 mils, the thickness of the core at the outer diameter is 15 mils and the thickness of the core at the inner diameter is 3 mils.

8. A high speed magnetic core composed of a generally toroidal shaped ferromagnetic material which has a rectangular hysteresis loop, said core comprising a cross sectional area defined by an outer and at least one inner periphery, said outer and inner peripheries each having a uniform width, and a diametrical cross section wherein the outer periphery at its widest dimension is thicker than the inner periphery, a flat surface on one side of the core, and a varying surface on the other side of the core.

9. A high speed magnetic core composed of a generally toroidal shaped ferromagnetic material which has a rectangular hysteresis loop, said core comprising a first portion of a thin water of said material which has a cross sectional area defined by an inner and an outer periphery, and a second portion disposed about the outer periphery, the cross sectional area of the combined first and second portions being defined by an outer periphery of said second portion and the inner periphery of said first portion, said outer and inner peripheries each having a uniform width and a diametrical cross section wherein the outer periphery at its widest dimension is thicker than the inner periphery.

10. A high speed magnetic core according to claim 9 wherein the inner and outer peripheries of the wafer are concentric circles.

11. A high speed magnetic core according to claim 10 wherein the thickness of the wafer is 3 mils, said second portion is in the form of a toroid, and the diameter of the inner periphery is 18 mils.

12. A high speed magnetic core composed of a generally toroidal shaped ferromagnetic material which has a rectangular hysteresis loop, said core comprising a cross sectional area defined by an outer periphery and several inner peripheries, said outer and inner peripheries each having a uniform width, and a diametrical cross section wherein the inner peripheries are thinner than the widest dimension of the outer periphery.

13. A high speed magnetic core according to claim 12 wherein there are two inner peripheries.

14. A high speed magnetic core according to claim 13 wherein the inner peripheries are circular in shape.

15. A high speed magnetic core according to claim 14 wherein the outer periphery is circular in shape.

References Cited by the Examiner

UNITED STATES PATENTS

| | | | |
|---|---|---|---|
| 2,615,996 | 10/1952 | Voigt | 336—211 X |
| 2,799,822 | 7/1957 | Dewitz | 340—174 X |
| 2,818,551 | 12/1957 | Van Oosterhout | 336—212 |
| 2,825,892 | 3/1958 | Duinker | 336—212 X |
| 2,982,948 | 5/1961 | Brownlow et al. | 340—174 |
| 3,092,813 | 6/1963 | Broadbent | 340—174 |
| 3,157,866 | 11/1964 | Lien | 340—174 |

OTHER REFERENCES

Borzorth, "Ferromagnetism," D. Van Nostrand Company, Inc., QC–753–B69–C.7, copyright 1951, page 494.

Sherin: "Transfluxor Oscillator," Electronics, March 4, 1960.

Trancrell and McMahon: "Studies in Partial Switching," Journal of Applied Physics, May 1960.

ROBERT K. SCHAEFER, *Primary Examiner.*

E. JAMES SAX, JOHN F. BURNS, *Examiners.*

T. J. KOZMA, *Assistant Examiner.*